(12) United States Patent
Bailleul et al.

(10) Patent No.: US 7,917,134 B2
(45) Date of Patent: Mar. 29, 2011

(54) METHOD AND SYSTEM FOR DETERMINING DETERIORATION IN THE QUALITY OF A MOBILE TELEPHONY NETWORK

(75) Inventors: Myriam Bailleul, Soignolles en Brie (FR); Catherine Vacherot-Sbaldi, Plaisir (FR)

(73) Assignee: Societe Francaise du Radiotelephone, Paris (FR)

( * ) Notice: Subject to any disclaimer, the term of this patent is extended or adjusted under 35 U.S.C. 154(b) by 773 days.

(21) Appl. No.: 11/950,887

(22) Filed: Dec. 5, 2007

(65) Prior Publication Data
US 2008/0176553 A1 Jul. 24, 2008

(30) Foreign Application Priority Data
Dec. 6, 2006 (FR) .................................. 06 10626

(51) Int. Cl.
*H04W 24/00* (2009.01)
(52) U.S. Cl. ........ 455/423; 455/405; 455/406; 455/407; 455/408
(58) Field of Classification Search .......... 455/405–408, 455/423
See application file for complete search history.

(56) References Cited

U.S. PATENT DOCUMENTS

| | | | | |
|---|---|---|---|---|
| 7,315,518 B1 * | 1/2008 | Siegrist | ......................... | 370/259 |
| 2003/0063732 A1 * | 4/2003 | Mcknight | ................ | 379/210.01 |

* cited by examiner

*Primary Examiner* — Huy Phan
*Assistant Examiner* — Stamford Hwang

(57) ABSTRACT

A method for determining deteriorations in the quality of a mobile or fixed telephony network on a day D (or at any other frequency, for example hour or minute) by implementing one or more items of special equipment in the network, wherein the method implements at least one measurement means and at least one calculation means, characterised in that the method including at least: a stage for selecting (S1) the Usage Messages (MU) (1) corresponding to each call of the day D (2a) or at any other frequency (for example hour or minute); a stage for characterising (S2) groups of UMs corresponding to the callbacks from among the UMs of the calls selected (4); a stage for filtering (S3a) the UMs in order to separate the UMs called "incoming—outgoing" (5), the UMs called "return incoming" (6) and the UMs called "return outgoing" (7); a stage for calculating at least one indicator (S7) by grouping the UMs (15) as a function of several common data fields; a stage for calculating the callback rates for an indicator; a stage for intervening to restore or improve the quality of the calls in the section of the network defined by at least one field code common to several UMs.

33 Claims, 3 Drawing Sheets

METHOD AND SYSTEM FOR DETERMINING DETERIORATION IN THE QUALITY OF A MOBILE TELEPHONY NETWORK

BACKGROUND

The disclosed embodiments relate to the field of determining the quality of a mobile telephony service, and in particular to the field of determining the quality of a mobile telephony network from the point of view of a user.

A mobile telephony network enables a mobile station, normally a telephone, to develop in a covered space bounded by the radio section of the network. This radio network, called BSS (Base Station Subsystem), consists of a hub of base stations, called BTSs (Base Transceiver Systems) for GSM or Node B for UMTS, and of their control stations, called BSC's (Base Station Controllers) for GSM or RNC for UMTS. The routing section of the network, called NSS (Network Subsystem), has the task of routing the call between two users of the network or outside the network, such as a fixed network, for example. This section consists of several MSCs (Mobile Switching Centres) which route the calls. The list of clients of the network operator is managed at this level by a single database, the HLR (Home Location Register). Correct operation of the different elements of the network is ensured by the operating and maintenance section of the network, also called OSS (Operation Subsystem).

Despite the maintenance carried out by the OSS it sometimes happens that users experience problems in connecting to the network from their telephone. These problems may be due to a connection difficulty, a communication problem or a sudden interruption in the communication. It may happen that these connection difficulties pass unnoticed in terms of the technical indicators for network quality. In fact, the technical indicators only allow a partial indication of the network status because these cuts or deteriorations may be due to technical problems arising at certain points of the network without technical indicators. Similarly, certain problems detected by the technical indicators are not apparent to the client because the network has recovered. Although the information provided by the technical indicators of the network relates to technical incidents on the network that may affect the client, it may also relate to incidents that have no effect.

To counter this problem several solutions have been established. On the one hand sensors, called "layers", which consist of automatic call generators, have been installed, and on the other hand testers are used to pass through the network testing its quality. Nevertheless, these solutions are considered very expensive and only supply information at particular points on the network at a given time, without enabling an overall representation of the network to be obtained that can be accessed by the user. Moreover, the analyses of the cuts known as "manufacturer equipment source" cuts are not comparable between equipment suppliers and are not representative of all the cuts encountered by the network users.

SUMMARY

The purpose of the disclosed embodiments is to eliminate one or more disadvantages of the prior art and, in particular, to propose a solution to enable deterioration in the quality of the network to be measured without modifying the network or adding a specific sensor or other measuring means, so that work can be done to improve the network.

This purpose is achieved by a method for determining deterioration in the quality of a mobile telephony network on a given day D, at an hour H or a minute M, making use of one or more particular items of equipment in the network, the method making use of at least one measuring means and at least one calculation means, characterised in that the method comprises at least:

an acquisition stage for the Mobile services Switching Centres (MSCs or commutation switches) of the network or at any other point on the network, for acquiring Usage Messages (UMs) corresponding to each call by recording the UM data in a storage means.

a "call date" field selection stage for extracting the UMs corresponding to each call of day D, hour H and minute M, by comparing the value of a "call date" field associated with each UM with the value of the "call date" field sought, the UMs being recorded in a storage means, a UM group characterisation stage corresponding to the callbacks among the UMs of the selected calls by comparing the value of a "previous call time difference" field associated with each UM with a value previously recorded in a storage means, the UMs of each group having identical "client", "caller" and "call date" fields.

a calculation stage for calculating at least one indicator per grouping of UMs as a function of one or more fields of common data, a calculation stage for calculating the callback rate for an indicator, a state for determining the quality of the transmissions in a section of the network defined by at least one field code common to several UMs, a stage for intervening to restore or improve the quality of the calls in a section of the network defined by at least one field code common to several UMs.

According to one variant of the disclosed embodiments the method is characterised in that the transmission quality determination stage comprises a sub-stage for comparing the callback rate on day D, at hour H and minute M in the section of the network defined by at least one field code common to several UMs, with the analysis of the values of the callback rates for D-1, H-1 or M-1, and for following up the slow deviations based on a time-based analysis in this same section of the network and recorded in a storage means.

According to another variant of the disclosed embodiments the method is characterised in that the transmission quality determination stage comprises a sub-stage for comparing the callback rate in the section of the network defined by at least one field code common to several UMs with the callback rates for the adjacent sections of the network.

According to another variant of the disclosed embodiments the method is characterised in that the transmission quality determination stage comprises a sub-stage for comparing the callback rate in the section of the network defined by at least one field code common to several UMs with the manufacturer cut rate for that section of the network.

According to another variant of the disclosed embodiments the method is characterised in that the selection stage comprises a sub-stage for filtering the UMs by comparing the value of a "population type" field associated with each UM with the value of a field recorded in a storage means for separating the transmissions of the different possible types of clients, subscribed, prepaid, roamers in (en route) etc.

According to another variant of the disclosed embodiments the method is characterised in that the method comprises a stage for filtering the UMs by comparing the values of the "call type" fields associated with each UM with the values of the corresponding fields recorded in a storage means and a means for separating the UMs, called "incoming—outgoing", of the UMs called "returns outgoing" and the UMs called "returns incoming".

According to another variant of the disclosed embodiments the method is characterised in that it comprises a field determination stage supplying geographical and technical information, this being achieved first of all by recovering at least one list containing at least one reference for each value of the "cell code" field of each UM by comparing the "cell code" field associated with each UM with the values displayed by the loaded list.

According to another variant of the disclosed embodiments the method is characterised in that the callback rate calculation stage makes use of an algorithm executing the following operation:

$$\text{Callback Rate} = \frac{\text{Number of Callbacks}}{(\text{Number of Calls} - \text{Number of Callbacks})}$$

According to another variant of the disclosed embodiments the method is characterised in that the UM characterisation stage corresponding to the callbacks among the UMs of the calls selected is carried out by comparing the value of a "previous call time difference" field associated with each UM with a threshold value of at least 45 seconds.

According to another variant of the disclosed embodiments the method is characterised in that it comprises:
  a stage for calculating at least one type of tester, the testers being defined on day D-1,
  a stage for eliminating the UMs carried out on day D by the testers, the testers being defined on day D-1.

According to another variant of the disclosed embodiments the method is characterised in that a tester calculation stage consists in retaining the "incoming—outgoing" UMs corresponding to at least five callbacks in less than one minute to evaluate the callback rate.

According to another variant of the disclosed embodiments the method is characterised in that a tester calculation stage defines a second type of tester on the one hand by measuring at least seven callbacks in one day by a user and on the other hand by measuring at least fifty percent of the callbacks made to the same caller called the "majority caller", from among the "incoming—outgoing" UMs.

According to another variant of the disclosed embodiments the method is characterised in that a calculation means that enables a first variable, "variable 1", and a second variable, "variable 2", to be calculated from data on the UMs, the first variable "variable 1" being defined as the average of the call times added to the standard deviation in duration between the calls and their respective callbacks, and the second variable "variable 2" being defined as the sum of the standard deviation in duration of the calls and the standard deviation in duration between the calls and their respective callbacks, the second type of tester is defined either by measuring at least 40 callbacks made to the "majority caller", or on the one hand by measuring at last 15 callbacks made to the "majority caller" and a first variable "variable 1" less than a value recorded in a storage means, and on the other by measuring a first variable "variable 1" higher than a value recorded in a storage means, then measuring a second variable "variable 2" lower than or equal to a recorded value.

According to another variant of the disclosed embodiments the method is characterised in that the UMs, called "incoming—outgoing", have a selection stage so that the "incoming" UMs with a caller inside the network are separated from the "outgoing" UMs with a caller inside the network by comparing the value of their respective "nature of caller" field with a value recorded in a storage means, this recorded value being that of a caller inside the network.

According to another variant of the disclosed embodiments, the method is characterised in that the UMs called "return incoming" have a field processing stage so that the fields of the UMs are modified to correspond to UM fields without return from the second mobile station of the network to the first mobile station of the network.

According to another variant of the disclosed embodiments the method is characterised in that the UMs called "return outgoing" have a processing stage so that the fields of the UMs are modified to correspond to UMs without return from the first mobile station of the network to the second mobile station of the network.

According to another variant of the disclosed embodiments the method is characterised in that it comprises a search stage, for each "return" UM, for seeking an "incoming/outgoing" UM that has identical "client number", "caller number", "call date" and "call time" fields, by comparing the values of the fields whilst taking into account a variable Δ which enables the difference between the MSC clocks to be overcome in order to supply to each "return" UM the equipment fields of the corresponding mobile-mobile UM.

According to another variant of the disclosed embodiments the method is characterised in that it comprises a stage for calculating at least one indicator associated with a cell of the MSC called "cell MSC Code" obtained by grouping together the UMs having identical "call date", "department", "region", "MSC", "LAC", "cell", "nature of caller" and "population type" fields.

According to another variant of the disclosed embodiments the method is characterised in that it comprises a stage for calculating at least one indicator associated with a bundle called "MSC Bundle" obtained by grouping together the UMs having identical "call date", "department", "region", "MSC", "LAC", "Bundle", "nature of caller" and "population type" fields.

According to another variant of the disclosed embodiments the method is characterised in that it comprises a stage for calculating at least one indicator associated with fax data called "Fax-Data/MSC" obtained by grouping together the UMs having identical "call date", "region", "MSC", "nature of caller" and "type of population" fields.

According to another variant of the disclosed embodiments the method is characterised in that it comprises a stage for calculating at least one indicator associated with EZABP numbers called "MSC-EZABP" obtained by grouping together the UMs having identical "call date", "department", "region", "MSC", "EZABP", "nature of caller" and "population type" fields.

According to a variant of the disclosed embodiments the method is characterised in that it comprises a stage for calculating at least one indicator which can be associated with any other type of data available in the UM (for example "APN" (Access Point Name) for the UMs of the Data type, which may be likened to "caller" of the voice type UM) obtained by grouping together the UMs having "call date", "nature of caller", "network equipment node", and possibly fields relating to geographical concepts.

Another variant may be applied to a fixed telephony network with the same groupings of UMs (call date, nature of caller, population type, network equipment nodes, geographical concepts, etc.)

Another purpose of the disclosed embodiments is to propose a system that allows the use of this method of monitoring the quality of a mobile telephony network.

This purpose is achieved by means of a system for determining deterioration in the quality of a mobile telephony network on a day D, at an hour H or minute M, by using one or more particular items of equipment of the network, characterised in that the system comprises at least:
- a device for the acquisition, for the Mobile Services Switching Centres (MSCs, commutation switches), on the network, or at any other point on the network, of the Usage Messages (UMs) corresponding to each call by recording of the UM data in a storage means,
- a device for transmitting the data from the recorded UMs from the MSCs to a centralised unit,
- a device for selecting the centralised unit, comprising a comparison and a storage means in which a value of the "call date" field is recorded to select the UMs of the day D, the hour H or the minute M,
- a device for filtering the UMs, comprising a means for comparing the values of the "caller" fields associated with each UM with values of the "caller" fields recorded in a storage means and a means of separating the so-called "incoming—outgoing" UMs, the so-called "return incoming" UMs and the so-called "return outgoing" UMs based on the "UM type" field,
- a device for characterising the callbacks for selecting the UMs to be considered as callbacks from the UMs in the group having identical "client", "caller" and "call date" fields, the device comprising a comparison means and a storage means in which a value of the "previous call time difference" field is recorded,
- a device for determining at least one type of tester, this device being connected to a storage means which records the newly recognised testers, the storage means being itself connected to a selection device which deletes the UMs deriving from callers recognised as testers,
- a device for determining fields supplying geographical and technical information as a function of the "cell code" field of the UMs connected to a device for recovering at least one list containing at least one reference for each value of the "cell code" field, the determination device comprising a means of comparing the "cell code" associated with each UM with the values displayed by the loaded list,
- a device for calculating at least one indicator by grouping together the UMs as a function of several fields of common data between them,
- a device for transmitting the calculated indicators to a server to which local units have access,
- a device for calculating the rate of callbacks using an algorithm executing the following operation $$\text{Callback Rate} = \frac{\text{Number of Callbacks}}{(\text{Number of Calls} - \text{Number of Callbacks})}$$

- a signaling device that enables an intervention to be triggered for restoring or improving the quality of the call in a section of the network linked to the calculated callback rate.

According to a variant of the disclosed embodiments the system is characterised in that it comprises a device for determining the quality of the calls, comprising at least one comparison means and storage means with at least one recorded value corresponding to the mean value of the callback rates calculated on day D-1, at hour H-1 and minute M-1, and following up the slow deviations based on a time-based analysis According to another variant of the disclosed embodiments the system is characterised in that it comprises a device for determining the quality of the calls, comprising at least one comparison means and one storage means, with at least a recorded value corresponding to the manufacturer cut rate.

According to another variant of the disclosed embodiments the system is characterised in that it comprises a UM filtering device comprising a means of comparing the value of a "population type" field associated with each UM with the value of a field recorded in a storage means for separating the transmissions of the different possible types of clients: subscribers, prepaid, roamers in, etc.

According to another variant of the disclosed embodiments the system is characterised in that it comprises at least one device for determining at least one type of tester, this device being connected to a storage means which records the newly recognised testers, the storage means itself being connected to a selection device which deletes the UMs deriving from callers recognised as testers.

According to another variant of the disclosed embodiments the system is characterised in that it comprises at least one tester type recognition device, the recognition device comprising at least one recording means in a storage means, the values of the "caller" field of the "incoming—outgoing" UMs for which on the one hand the UMs have identical "client", "caller" and "call date" fields, and on the other have a means for measuring at least five callbacks in one minute.

According to another variant of the disclosed embodiments the system is characterised in that it comprises at least one tester type recognition device, the recognition device comprising at least one recording means in a storage means, the values of the "caller" field of the "incoming—outgoing" UMs for which on the one hand the UMs have identical "client", "caller" and "call date" fields on the one hand, and on the other have a means for measuring at least seven callbacks in one day, at least fifty percent of which were made with the same caller called the "majority caller".

According to another variant of the disclosed embodiments the system is characterised in that it comprises a device for processing the so-called "return incoming" UMs, comprising a means of modifying the fields of the UMs in order to match the so-called "return incoming" UMs with UMs without return from the second mobile station of the network to the first mobile station of the network.

According to another variant of the disclosed embodiments the system is characterised in that it comprises a device for processing the so-called "return outgoing" UMs, comprising a means of modifying the fields of the UMs in order to match the so-called "return outgoing" UMs with UMs without return from the first mobile station of the network to the second mobile station of the network.

According to another variant of the disclosed embodiments the system is characterised in that it comprises a search device for each "return" UM of an "incoming—outgoing" UM which has identical "client number", "caller number", "call date" and "call time" fields, by implementing a comparison means integrating a variable Δ which enables the difference between the MSC clocks to be controlled, this variable being defined and recorded in a storage means.

According to another variant of the disclosed embodiments the system is characterised in that it comprises an alarm device connected to a means of comparing the callback rate with a threshold value pre-recorded in a storage means.

BRIEF DESCRIPTION OF THE DRAWINGS

The disclosed embodiments, with its characteristics and advantages, will be more clearly understood from a reading of the description with reference to the attached drawings, in which.

DETAILED DESCRIPTION OF THE EXEMPLARY EMBODIMENT(s)

Figure 1A:
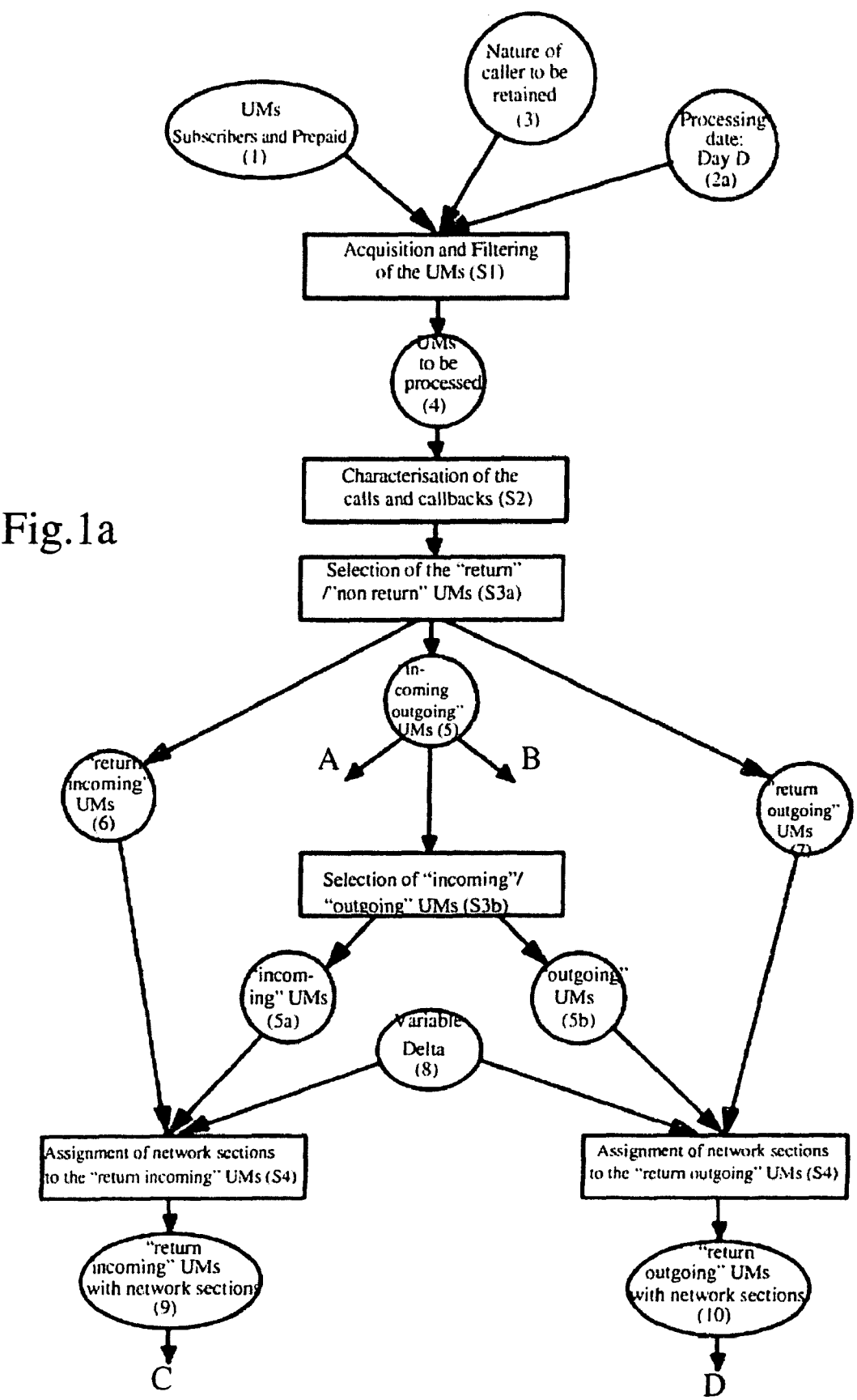
FIGS. 1a and 1b show a diagram of the architecture of the method for determining deteriorations in the quality of a mobile telephony network.
Figure 1B:
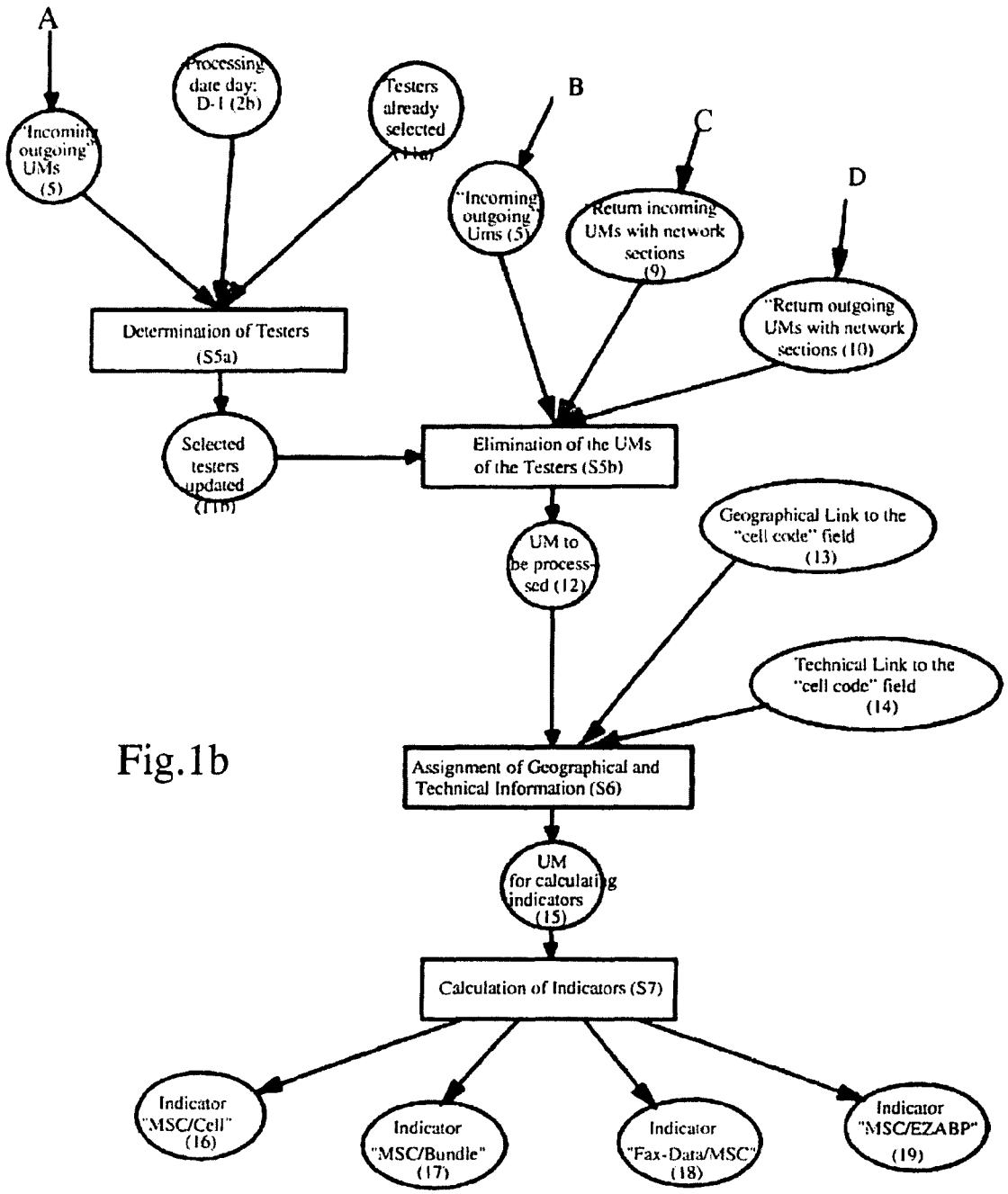
Figure 2:
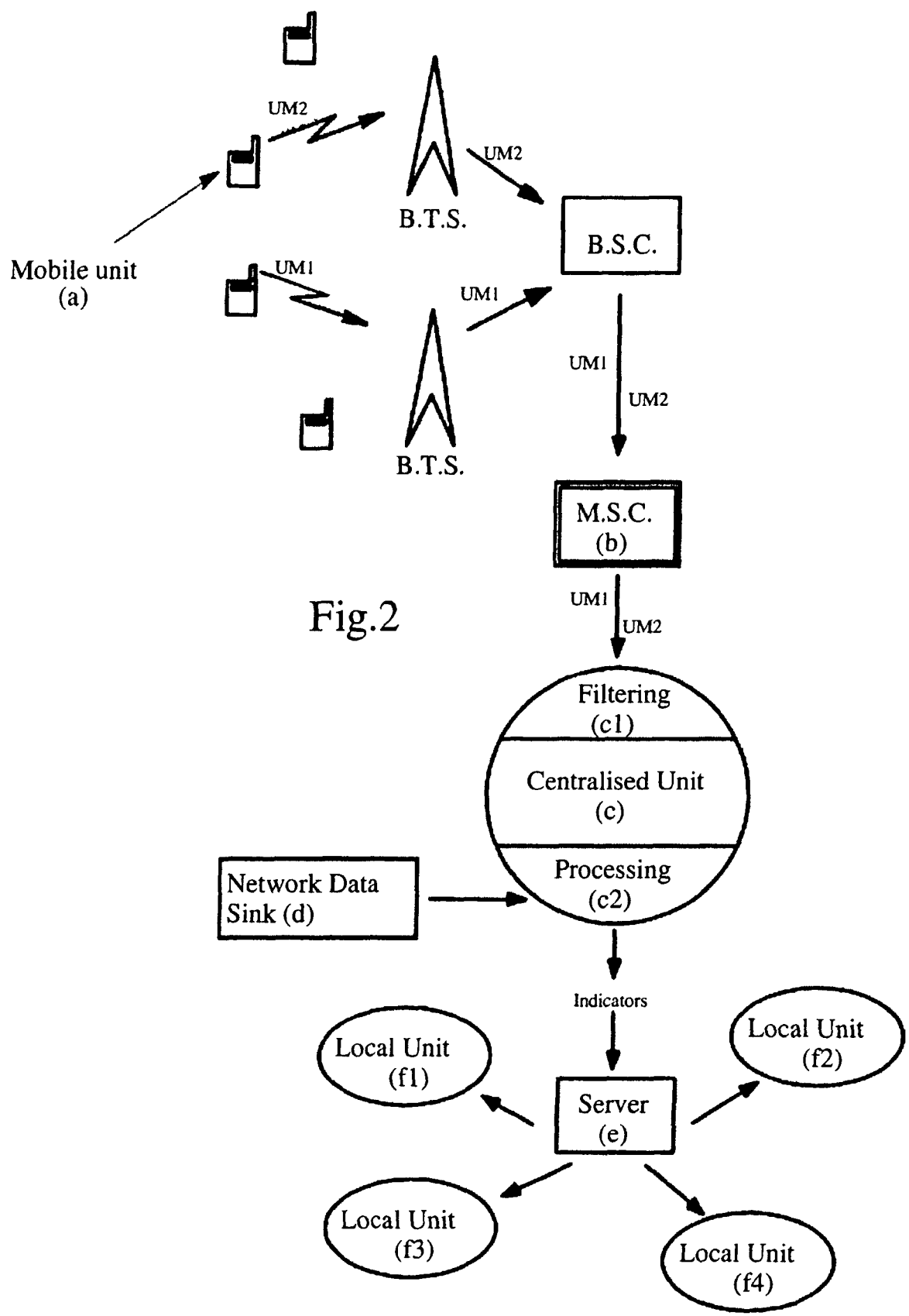
FIG. 2 shows a diagram of the architecture of the system for determining deteriorations in the quality of a mobile telephony network.

Technically it is difficult to determine the quality of a mobile telephony network from the point of view of the user in order to establish the coverage of a network at any given time. On the other hand, when a user is located in an area whose network coverage is such that it generates a call of poor quality, or even cuts off the call in progress, the user adopts a characteristic behaviour which consists in calling back the person he or she is calling to end the call. Based on a measurement and calculation of the callbacks throughout the territory covered by a network it is easy to identify quickly those sections of the network which have coverage of a poorer quality or deterioration in the quality of service (QoS). In addition to the transmission fault, the use of callbacks as a quality index also enables the auditive or visual deterioration to be quantified, as perceived by the user. Until now this was impossible to do systematically in both time and space. Similarly, if the "data" service is being used and the session is interrupted or deteriorates (slowness), if there is a blockage or the expected data is not obtained, the user adopts a characteristic behaviour which consists in restarting a new session to obtain his or her data.

Every call made and every call that passes via a mobile unit (a) of the mobile telephony network monitored generates a usage message that transmits a ticket corresponding to a group of data fields. This data corresponds, for example, to the client number, the caller number, the date and time of the call. These usage messages (UMs) are used to charge each call that is generated by a user, subscriber, prepaid, roamer in (en route) or other. The data is recovered from the tickets at the collection-valuation interface of the network, i.e. at the MSC (Mobile Services Switching Centre) (b), to be transmitted to a centralised processing unit (c). At this level the acquisition of the data enables all the Usage Messages (UMs) to be recovered from the subscriber and prepaid clients (1) for a given day D, hour H or even minute M (2a). A further version of the application enables the data to be recovered from collection and the additional data relating to other clients (e.g. roamers in (en route) (clients en route), MVNO (Mobile Virtual Network Operator), etc.) also to be recovered. The use of the information for financial purposes, which the UMs are, to obtain a measurement of the quality of transmissions throughout a network, implements one or more software systems. These software systems allow on the one hand filtering (c1) and selection of the UMs, and on the other hand processing (c2) of the UMs selected to provide an effective tool for determining the quality of the calls, audio, visual and data, as perceived by a user.

After acquisition the flow of UMs is managed by a filtering unit which enables the selection of UMs to be stored (S1). In fact, there is no need to take account of the different UMs on the given day D (or hour H or even minute M), UMs of a technical nature (e.g. activation of a subscription option) or the UMs whose ticket data cannot be used. It is then necessary to separate the UMs originating from the different client types. This separation prevents behavioural interferences. These UM selection stages, depending on the date (2a) and nature of the caller (3), implement at least one means of comparing the values of fields associated with each UM with field values pre-recorded in storage means. These values correspond to the "call date" field for selecting the UMs for a given day D (or hour H or even minute M) and to the "population type" field for segregating the subscribed and prepaid UMs.

The callbacks (S2) are characterised by a characterising unit from the flow of UMs recovered and filtered (4). The UMs are regrouped by means of a processing device so that all the UMs in the same group have identical "clients", "caller" and "call date". Thanks to the UMs' "call time" fields, the UMs of each of the groups are processed in chronological order. A calculation means supplies the time between the end of the $UM_n$ and the beginning of the $UM_{n+1}$ for two consecutive UMs. This time is assigned to the "previous call time difference" field of the $UM_{n+1}$. By comparing the value of this field with a recorded threshold value, the $UM_{n+1}$ is then determined as being or not being a callback relating to the $UM_n$. In a preferred embodiment the recorded threshold value is at least 45 seconds. Therefore all the UMs having a "previous call time difference" field lower than this threshold value are defined as callbacks.

The flow of UMs whose calls/callbacks are characterised is divided according to the type of call each UM represents (S3a). In fact, a first category of calls, called "incoming outgoing", lies inside the network, a second category of calls, called "return outgoing", generate call returns outside the network, and finally a third category of calls, called "return incoming", result from call returns from outside the network. The UMs recovered are then processed on the basis of the values of the "caller" fields associated with each UM by comparison with values recorded in a storage means. Moreover, the UMs of the "returns" have a third caller, and the fields of these UMs are modified to facilitate a calculation of the callbacks on the network. In fact, these "returns" indicate a call between two mobile stations, which have in fact not been in communication.

The UMs of the "return incoming" UM flow (6) are specially processed. The "return incoming" UMs (6) result from a call from a station outside network X to a first mobile station A sent to a second mobile station B. These UMs are modified by a field processing device so that they correspond to UMs without returns from the second mobile station B to the first mobile station A. The "client number" and "caller number" fields are reversed while the "population type" and "network section" fields are blanked.

Similarly, the UMs of the flow of "return outgoing" UMs (7) are also subject to special processing. The "return outgoing" UMs (7) result from a call from a first mobile station A to a second mobile station B sent to a station outside network X. These UMs are modified by a field processing device so that they correspond to UMs without return from the first mobile station A to the second mobile station B. The "client number" field is assigned to the "caller number" field and the "third caller number" field is transferred to the "client number" field, while the "population type" and "network section" fields are blanked and the "nature of caller" field is forced as if it were inside the network. These modifications therefore enable the third caller in the call to be dispensed with.

The UMs of the "incoming outgoing" UM (5) are also subject to special processing (S3b). The "incoming outgoing" UMs result from a call between two mobile stations without return. These UMs are processed by comparing the value of the respective "nature of caller" field with a value recorded in a storage means, this recorded value being that of a caller inside the network. Selection is then made to ensure that the "incoming" UMs (5a) with a caller inside the network are separated from the "outgoing" UMs (5b) with a caller inside the network.

In each of the flows of "return", "incoming" (6) and "outgoing" (7) UMs respectively, processing is carried out to assign a section of the network (S4) to the "return" UM. To achieve this, the "incoming" UMs (5a) of the "incoming—outgoing" UMs (5) then rejoin the flow of "return incoming" UMs (6) and respectively, the "outgoing" UMs (5b) of the "incoming—outgoing" UMs (5) then rejoin the flow of "return outgoing" UMs (7). By means of a comparison device integrating a variable Δ (8), which enables the difference between the MSC clocks to be controlled, an "incoming/outgoing" UM (5a or 5b), which has identical "client number", "caller number", "call date" and "call time" fields, to be sought for each "return" UM (6 or 7). Each "return" UM (6 or 7) associated with an "incoming/outgoing" UM (5a or 5b) recovers its fields from the network section (MSC, Cell, LAC, incoming bundle/outgoing bundle) on the one hand, and from the population type (subscriber/prepaid) on the other. This matching enables the equipment fields of the corresponding mobile-mobile UM to be supplied to each "return" UM (6 or 7). The "return" UMs (6 or 7) which cannot be associated with an "incoming/outgoing" UM (5a or 5b) are eliminated.

A tester processing unit enables the testers (S5a) to be determined in order to eliminate the UMs originating from programmed probes in order to make repeated calls whose callbacks interfere with the results for the callback rates. The testers that are considered for processing are defined on day D-1, at hour H-2 or minute M-1 (2b). The data enabling these testers to be identified is recorded in a storage means so that it can be used in subsequent processing. The file of testers already determined or selected (11a) is updated regularly so that the testers who have not displayed a tester behaviour for a defined number of days have their data removed. According to a preferred embodiment this number of days is 16. The testers may be subscribers or prepaid, but they do not make "returns"; this stage therefore only relates to the "incoming—outgoing" UMs (5). The tester recognition device then comprises at least one recording means in a storage means for recording the values of the "caller" field of the UMs for which the UMs have the same "client" field, the same "caller" field and the same "call date" field. Two types of testers are defined. A first series tester makes at least five callbacks in less than a minute, and a second series tester makes at least seven callbacks in one day and at least 50% of these callbacks are made to the same caller qualified as "majority".

In the case of the second series testers, two variables are calculated for each potential tester. The first variable, called "variable 1", is defined as the mean value of the durations of the calls added to the standard deviation in times between the calls and their respective callbacks. The second variable, called "variable 2", is defined as the sum of the standard deviation between the times of the calls and the standard deviation in times between the calls and their respective callbacks.

The user is considered to be a second series tester, whether he/she makes at least 40 callbacks with his/her "majority caller", he/she makes at least 15 callbacks with his/her "majority caller" and with a "variable 1" lower than a value recorded in the storage means, or whether he/she makes at least 15 callbacks with his/her "majority caller", with a "variable 1" higher than a value recorded in a storage means and with a "variable 2" lower than or equal to a value recorded in a storage means. According to a preferred selection mode the value recorded in the storage means, and with which the "variables 1 and 2" are compared, is 7.

Once the testers have been determined, the file of selected testers (11b) is updated and the UMs deriving from these testers are removed (S5b) from the respective flows of "incoming—outgoing" (5), "return incoming" (9) and "return outgoing" (10) UMs characterised and modified by a section of the network.

Once the testers have been eliminated, the flow of UMs (12) is recovered by a unit assigning a geographic and technical region processing the UMs so that the fields of the UMs supplying geographic and technical information are modified by the respective data corresponding to the "cell code" field (S6). This operation is carried out by a processing device connected to a database recovery device for correspondence between the "cell code" and "department" fields on the one hand and between the "cell code" and "technical region" fields on the other, these databases (13 and 14), supplied by the NDS (Network Data Sink) (d), being regularly updated and renewed. The NDS (d) is an information device which centralises the information relating to the different network equipment. The processing device comprises a means of comparison with the databases recorded in a storage means. These databases (13 and 14) correspond to daily files and enable much more detailed information corresponding to the "Region", "Router" fields etc. referencing each cell geographically (13) and technically (14) to be associated with the network data deriving from UMs such as the "Cell", "MSC", "Bundle" or "LAC" fields. The fields relating to the "department" and to the technical devices are therefore recovered from the "cell code" field.

The flow of processed UMs (15) terminate at a processing unit in which indicators are calculated (S7). These indicators implement a calculation device comprising at least one selection means which groups the different UMs into four types of indicators according to some of the fields of the UMs.

A first type of indicator, called "MSC/Cell code" (16), is obtained by grouping the UMs having at least the identical fields "call date", "department", "region", "MSC", "LAC", "cell", "nature of caller" and "population type".

A second type of indicator, called "MSC/Bundle" (17), is obtained by grouping the UMs having at least the identical fields "call date", "department", "region", "MSC", "LAC", "Bundle", "nature of caller" and "population type".

A third type of indicator, called "Fax/Data" (18), is obtained by grouping the UMs having at least the identical fields "call date", "region", "MSC", "nature of caller" and "population type".

A fourth type of indicator associated with the EZABP numbers, called "MSC/EZABP" (19), is obtained by grouping the UMs having at least the identical fields "call date", "department", "region", "MSC", "EZABP", "nature of caller" and "population type".

According to another variant of the disclosed embodiments the method is noteworthy in that it comprises a stage for calculating an indicator that may be associated with any other type of data available in the UM (for example, APN (Access Point Name) for the UMs of the Data type, etc.) obtained by grouping the UMs having "call date", "nature of caller" "network equipment node" fields and possibly fields relating to geographical concepts.

Another variant may be applied to a fixed telephony network with the same groupings of UMs (call date, nature of caller, population type, network equipment nodes, geographical concepts, etc.).

The different groupings of UMs obtained are then supplied on a server (e) for use by the local units (f1, f2, f3, f4), for example regional network monitoring antennae.

For each of the groupings made the callback rate is calculated according to the formula:

$$\text{Callback Rate} = \frac{\text{Number of Callbacks}}{(\text{Number of Calls} - \text{Number of Callbacks})}$$

For each type of indicator, and according to the fields common to the UM of each grouping, it is therefore possible to have callback rates for the "incoming—outgoing" calls/callbacks, for the "return" calls/callbacks, for the "outgoing data" calls/callbacks, etc.

The quality of the transmission from an indicator is determined by comparing the callback rate in the section of the network defined by the indicator with the analysis of the values of the callback rates for D-1 (H-1 or M-1) and follow-up of the slow deviations based on a time-based analysis in this section of the network and recorded in a storage means. Similarly, the quality of the transmission can be determined by comparing the rate of callbacks in a section of the network defined by the indicator with the manufacturer cut rate in this same section of the network recorded in a storage means. The quality of the transmission for a section of the network that implements special equipment may also be determined by comparing the rate of callbacks with the adjacent sections of the network that implement this same special equipment. If these comparisons indicate either a major increase in the callback rate or a significant difference with the manufacturer cut rate or the callback rates of the adjacent sections, an intervention stage in the area defined by the indicator is required to restore or improve the quality of the calls.

It must be evident to persons skilled in the art that the disclosed embodiments allow embodiments in numerous other specific forms without departing from the scope of the disclosed embodiments as claimed. Consequently these embodiments must be considered by way of illustration but can be modified within the field defined by the scope of the attached claims.

The invention claimed is:

1. A method for the determination of deteriorations in the quality of a mobile telephony network on a day D, at an hour H or minute M, making use of one or more items of special equipment in the network, wherein the method implements a measurement means and a calculation means, characterised in that the method comprises at least:
    a stage for acquisition, at the Mobile Services Switching Centres (MSCs, commutation switches) of the network or at any other point in the network, of Usage Messages (UMs) (1) corresponding to each call by the recording of the data in the UMs in a storage means,
    a stage for selection (S1) of a "call date" field for extracting the UMs (1) corresponding to each call on day D, at hour H or minute M, (2a) by comparing the value of a "call date" field associated with each UM (1) with the value of the "call date" field sought, wherein the UMs (1) are recorded in a storage means,
    a stage for characterising (S2) groups of UMs corresponding to the calls from among the UMs of the selected calls (4) by comparing the value of a "previous call time difference" field associated with each UM with a value previously recorded in a storage means, wherein the UMs of each group have identical "client", "caller" and "call date" fields,
    a stage for calculating at least one indicator (S7) by grouping the UMs as a function of one or more common data fields,
    a stage for calculating a callback rate for an indicator,
    a stage for determining the quality of the transmissions in a section of the network defined by at least one field code common to several UMs,
    a stage of intervention to restore or improve the quality of the calls in a section of the network defined by at least one field code common to several UMs, and
    characterised in that the callback calculation stage applies an algorithm executing the following operation: Callback Rate=Number of Calls ( Number of Calls−Number of Callbacks).

2. The method for determining deteriorations in the quality of a mobile telephony network according to claim 1, characterised in that the stage for determining the quality of the transmissions comprises a sub-stage for comparing the callback rate on day D, at hour H or minute M, in the section of the network defined by at least one field code common to several UMs, with an analysis of the callback rates for D-1, H-1 or M-1 (2b) and a follow-up of the slow deviations based on a time-based analysis in this same section of the network and recorded in a storage means.

3. The method for determining deteriorations in the quality of a mobile telephony network according to claim 1, characterised in that the stage for determining the quality of the transmissions comprises a sub-stage for comparing the callback rate in the section of the network defined by at least one field code common to several UMs with the callback rates of the adjacent sections of the network.

4. The method for determining deteriorations in the quality of a mobile telephony network according to claim 1, characterised in that the stage for determining the quality of the transmissions comprises a sub-stage for comparing the callback rate in the section of the network defined by at least one field code common to several UMs with the manufacturer cut rate for this section of the network.

5. The method for determining deteriorations in the quality of a mobile telephony network according to claim 1, characterised in that the selection stage (S1) comprises a sub-stage for filtering the UMs (1) by comparing the value of a "population type" field associated with each UM (1) with the value of a field recorded in a storage means for separating the subscriber transmissions from the prepaid transmissions.

6. The method for determining deteriorations in the quality of a mobile telephony network according to claim 1, characterised in that the method comprises a stage for filtering (S3a) the UMs by comparing the values of the "call type" fields associated with each UM with the values of the corresponding fields recorded in a storage means and a means of separating the UMs called "incoming—outgoing" from the UMs called "return outgoing" and the UMs called "return incoming" based on a "UM type" field.

7. The method for determining deteriorations in the quality of a mobile telephony network according to claim 1, characterised in that the method comprises a stage for determining (S6) the fields supplying geographical and technical information carried out by first recovering at least one list (13 and/or 14) containing at least one reference for each value of the "cell code" field of each UM by comparing the "cell code" field associated with each UM with the values displayed by the loaded list.

8. The method for determining deteriorations in the quality of a mobile telephone network according to claim 1, characterised in that the stage for characterising (S2) the UMs corresponding to the callbacks from among the UMs (4) of the selected calls is carried out by comparing the value of a "previous call time difference" field associated with each UM with a threshold value of at least 45 seconds.

9. The method for determining deteriorations in the quality of a mobile telephony network according to claim 6, characterised in that the method comprises:
- a stage for calculating (S5a) at least one type of tester, the testers being defined on day D-1,
- a stage for eliminating (S5b) the UMs carried out on day D by the testers, the testers being defined on day D-1.

10. The method for determining deteriorations in the quality of a mobile telephony network according to claim 9, characterised in that a tester calculation stage (S5a) consists in retaining the "incoming—outgoing" UMs corresponding to at least five callbacks in less than one minute in order to evaluate the callback rate.

11. The method for determining deteriorations in the quality of a mobile telephony network according to claim 9, characterised in that a tester calculation stage (S5a) defines a second type of tester by measuring at least seven callbacks in one day by a user on the one hand, and by measuring at least fifty percent of the callbacks made to the same caller, called "majority caller", from among the "incoming—outgoing" UMs (5), on the other.

12. The method for determining deteriorations in the quality of a mobile telephony network according to claim 11, characterised in that a calculation means enables a first variable "variable 1" and a second variable "variable 2" to be calculated from the data of the UMs, wherein the first variable "variable 1" is defined as the mean value of the durations of the calls added to the standard deviation in times between the calls and their respective callbacks and the second variable "variable 2" is defined as the sum of the standard deviation in call times and the standard deviation in times between the calls and their respective callbacks, and wherein the second type of tester is defined either by measuring at least 40 callbacks made to his/her "majority caller" and by measuring at least 15 callbacks made to his/her "majority caller" and a first variable "variable 1" lower than a value recorded in a storage means on the one hand, and by measuring a first variable "variable 1" higher than a value recorded in a storage means and a second variable "variable 2" lower than or equal to a recorded value on the other.

13. The method for determining deteriorations in the quality of a mobile telephony network according to claim 6, characterised in that the UMs called "incoming—outgoing" (5) have a selection stage (S3b) so that the "incoming" UMs (5a), with a caller inside the network, are separated from the "outgoing" UMs (5b) with a caller inside the network by comparing the value of their respective "nature of caller" field with a value recorded in the storage means, wherein this recorded value is that of a caller inside the network.

14. The method for determining deteriorations in the quality of a mobile telephony network according to claim 6, characterised in that the UMs called "return incoming" (6) have a field processing stage so that the fields of the UMs are modified to correspond to fields of UMs without a return from the second mobile station of the network to the first mobile station of the network.

15. The method for determining deteriorations in the quality of a mobile telephony network according to claim 6, characterised in that the UMs called "return outgoing" (7) have a processing stage so that the fields of the UMs are modified to correspond to UMs without a return from the first mobile station of the network to the second mobile station of the network.

16. The method for determining deteriorations in the quality of a mobile telephony network according to claim 1, characterised in that the method comprises a search stage (S4) for each "return" UM (6 or 7), for seeking an "incoming/outgoing" UM (5a or 5b) having identical "client number", "caller number", "call date" and "call time" fields, by making a comparison between the values of these fields taking into account a variable $\Delta$ (8) that enables the difference between the MSC clocks to be overcome in order to supply to each "return" UM the equipment fields of the corresponding mobile-mobile UM.

17. The method for determining deteriorations in the quality of a mobile telephony network according to claim 1, characterised in that the method comprises a stage for calculating at least one indicator (S7) associated with one cell of an MSC called "MSC-cell code" (16) obtained by grouping the UMs having at least the identical fields "call date", "department", "region", "MSC", "LAC", "cell", "nature of caller" and "population type".

18. The method for determining deteriorations in the quality of a mobile telephony network according to claim 1, characterised in that the method comprises a stage for calculating at least one indicator (S7) associated with a bundle called "MSC-Bundle" (17) obtained by grouping the UMs having at least the identical fields "call date", "department", "region", "MSC", "LAC", "Bundle", "nature of caller" and "population type".

19. The method for determining deteriorations in the quality of a mobile telephony network according to claim 1, characterised in that the method comprises a stage for calculating at least one indicator (S7) associated with fax data called "Fax-Data/MSC" (18) obtained by grouping the UMs having at least the identical fields "call date", "region", "MSC", "nature of caller" and "population type".

20. The method for determining deteriorations in the quality of a mobile telephony network according to claim 1, characterised in that the method comprises a stage for calculating at least one indicator (S7) associated with EZABP numbers called "MSC-EZABP" (19) obtained by grouping the UMs having at least the identical fields "call date", "department", "region", "MSC", "EZABP", "nature of caller" and "population type".

21. The method for determining deteriorations in the quality of a mobile telephony network according to claim 1, characterised in that the method comprises a stage for calculating at least one indicator that can be associated with any other type of data available in the MU, obtained by grouping the UMs having "call date", "nature of caller", "network equipment node" fields and fields relating to geographical concepts.

22. The method for determining deteriorations in the quality of a mobile telephony network according to claim 1, characterised in that the method comprises a stage for calculating at least one indicator that can be associated with any other data available in the MU of the fixed network, call date, nature of caller, population type, network equipment node, geographical concepts relating to geographical.

23. A system for determining deteriorations in the quality of a mobile telephony network on a day D, at an hour H or a minute M, implementing one or more items of special equipment of the network, characterised in that the system comprises at least:

a device for acquisition, at Mobile Services Switching Centres (MSCs, commutation switches) (b) of the network or any other point in a network (fixed or mobile), of Usage Messages (UMs) (1) corresponding to each call by recording the UM data in a storage means, a device for transmitting the recorded data of the UMs (1) from the MSCs to a centralised unit (c), a selection device (c1) of the centralised unit (c) comprising a comparison means and a storage means in which a value of the "call date" field is recorded for selecting the UMs (1) on day D, at hour H or minute M (2a), a device for filtering the UMs (4), comprising a means for comparing the values of the "caller" fields associated with each UM with values of the "caller" fields recorded in a storage means, and a means for separating the UMs called "incoming—outgoing" (5) from the UMs called "return incoming" (6) and the UMs called "return outgoing" (7) based on the "type of UM" fields, a device for characterising the callbacks for selecting the UMs to be considered as callbacks from among the UMs (4) of the group having identical "client", "caller" (or APN for UMs of the DATA type) and "call date" fields, wherein the device comprises a comparison and a storage means in which a value of the "previous call time difference" field is recorded, a device for determining at least one type of tester, wherein this device is connected to a storage means which records the newly recognised testers (11) and wherein the storage means is itself connected to a selection device which deletes the UMs deriving from callers recognised as testers, a device for determining the fields supplying geographical and technical information as a function of the "cell code" field of the UMs (12) connected to a device for recovering (d) at least one list containing at least one reference for each value of the "cell code" field, wherein the determination device comprises a means for comparing the "cell code" field associated with each UM (12) with the values displayed by the loaded list, a device for calculating at least one indicator by grouping the UMs (15) as a function of several common data fields, a device for transmitting the calculated indicators to a server (e) to which local units (f1, f2, f3, f4) have access, a device for calculating the callback rate by applying an algorithm executing the following operation $$\text{Callback Rate} = \frac{\text{Number of Calls}}{(\text{Number of Calls} - \text{Number of Callbacks})}$$

signaling device enabling an intervention to be initiated to restore or improve the quality of the call in a section of the network linked to the calculated callback rate.

24. A system for determining deteriorations in the quality of a mobile telephony network according to claim 23, characterised in that the system comprises a device for determining the quality of the calls, comprising at least one comparison means and one storage means, with at least one recorded value corresponding to the mean value of the callback rates calculated on day D-1, at hour H-1 or minute M-1 (2b) and a follow-up of the slow deviations based on a time-based analysis.

25. A system for determining deteriorations in the quality of a mobile telephony network according to claim 23, characterised in that the system comprises a device for determining the quality of the calls, comprising at least one comparison means and storage means, with at least one recorded value corresponding to the manufacturer cut rate.

26. A system for determining deteriorations in the quality of a mobile telephony network according to claim 23, characterised in that the system comprises a device for filtering the UMs (1), comprising a means for comparing the value of a "population type" field associated with each UM (1) with the value of a field recorded in a storage means for separating the transmissions from the different types of clients, subscribers, prepaid, roamers in (en route) etc.

27. A system for determining deteriorations in the quality of a mobile telephony network according to claim 23, characterised in that the system comprises at least one device for determining at least one type of tester, wherein this device is connected to a storage means which records the newly recognised testers (11) and wherein the storage means itself is connected to a selection device which deletes the UMs deriving from callers recognised as testers.

28. A system for determining deteriorations in the quality of a mobile telephony network according to claim 27, characterised in that the system comprises at least one device for recognising a type of tester, wherein the recognition device comprises at least one recording means in a storage means for recording the values of the "caller" field of the "incoming—outgoing" UMs (5) for which the UMs (5) have identical "client", "caller" and "call date" fields on the one hand, and have a measurement means for determining at least five callbacks in one minute on the other.

29. A system for determining deteriorations in the quality of a mobile telephony network according to claims 27, characterised in that the system comprises at least one device for recognising a type of tester, wherein the recognition device comprises at least one recording means in a storage means for recording the values of the "caller" field of the "incoming—outgoing" UMs (5) for which the UMs having identical "client", "caller" and "call date" fields on the one hand, and a means for measuring at least seven callbacks in one day, and at least fifty percent of which were made with the same caller, called "majority caller".

30. A system for determining deteriorations in the quality of a mobile telephony network according to claim 23, characterised in that the system comprises a device for processing the UMs called "return incoming" (6), comprising a means for modifying the fields of the UMs in order to match the UMs called "return incoming" (6) to UMs without return from the second mobile station of the network to the first mobile station of the network.

31. A system for determining deteriorations in the quality of a mobile telephony network according to claim 23, characterised in that the system comprises a device for processing the UMs called "return outgoing" (7), comprising a means for modifying the fields of the UMs in order to match the UMs called "return outgoing" (7) to UMs without a return from the first mobile station of the network to the second mobile station of the network.

32. A system for determining deteriorations in the quality of a mobile telephony network according to claim 23, characterised in that the system comprises a search device, for each "return" UM (6 or 7), for seeking an "incoming/outgoing" UM (5) which has identical "client number", "caller number", "call date" and "call time" fields, by implementing a comparison means integrating a variable Δ (8) which enables the difference between the MSC clocks to be controlled, wherein this variable (8) is defined and recorded in a storage means.

33. A system for determining deteriorations in the quality of a mobile telephony network according to claim 23, characterised in that the system comprises an alarm device connected to a means for comparing the callback rate to a threshold value pre-recorded in a storage means.

* * * * *

UNITED STATES PATENT AND TRADEMARK OFFICE
CERTIFICATE OF CORRECTION

PATENT NO.       : 7,917,134 B2                                    Page 1 of 1
APPLICATION NO.  : 11/950887
DATED            : March 29, 2011
INVENTOR(S)      : Bailleul et al.

It is certified that error appears in the above-identified patent and that said Letters Patent is hereby corrected as shown below:

On the cover page, (57) Abstract, line 8, delete "(MU)" and insert -- (UM) --, therefor.

Column 13, line 5, Claim 8, delete "telephone" and insert -- telephony --, therefor.

Column 14, line 55, Claim 21, delete "MU" and insert -- UM --, therefor.

Column 14, line 63, Claim 22, delete "MU" and insert -- UM --, therefor.

Column 16, line 36, Claim 29, delete "claims" and insert -- claim --, therefor.

Signed and Sealed this
Fourteenth Day of June, 2011

David J. Kappos
*Director of the United States Patent and Trademark Office*